July 18, 1939. H. D. OAKLEY Re. 21,156

INDUCTOR COMPASS

Original Filed June 12, 1936 2 Sheets-Sheet 1

Inventor
Henry D. Oakley

By Munn, Anderson, Liddy
Attorneys

July 18, 1939. H. D. OAKLEY Re. 21,156
INDUCTOR COMPASS
Original Filed June 12, 1936 2 Sheets-Sheet 2
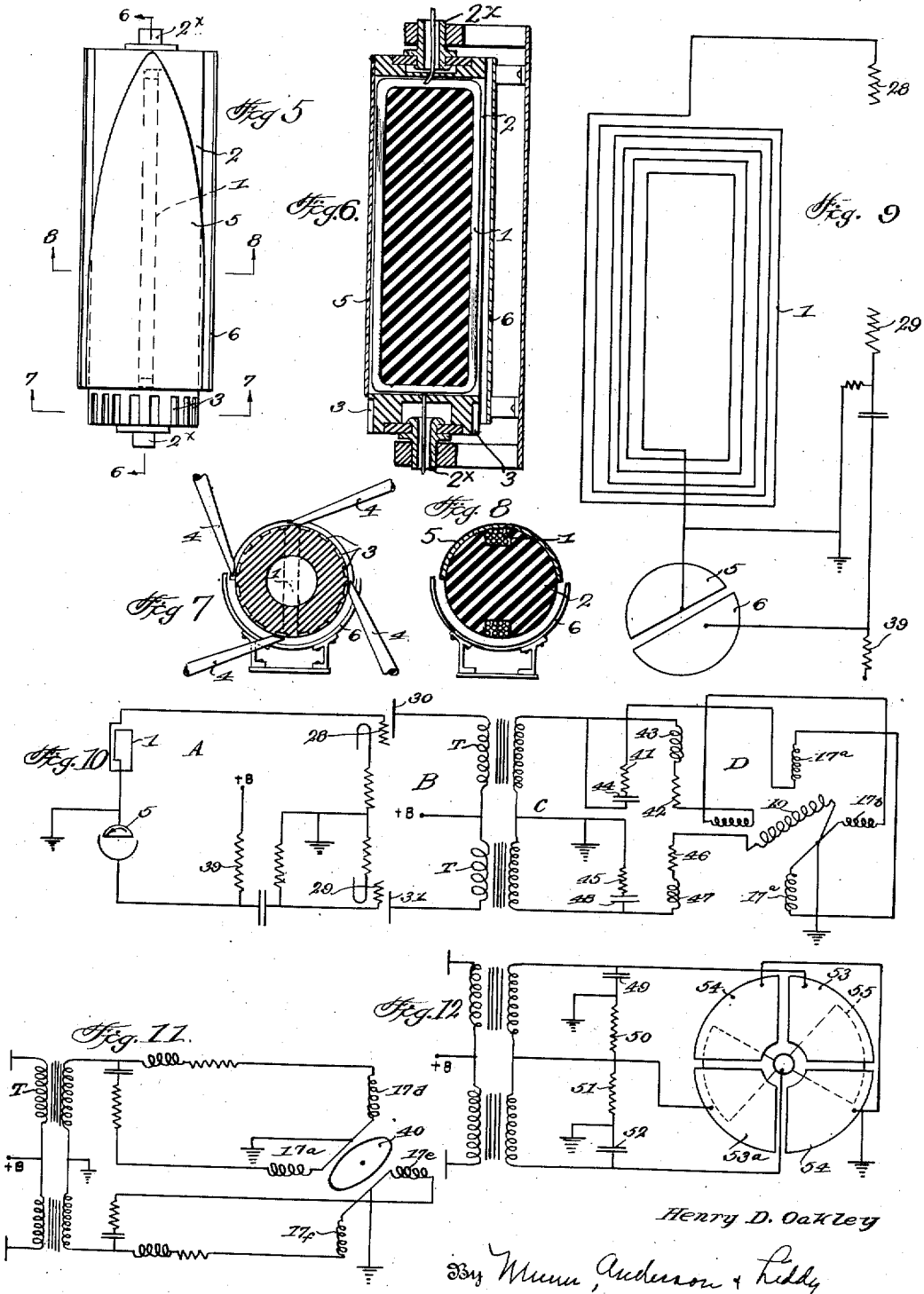
Henry D. Oakley
By Munn, Anderson & Liddy
Attorneys Reissued July 18, 1939

Re. 21,156

UNITED STATES PATENT OFFICE 21,156

INDUCTOR COMPASS

Henry D. Oakley, Woodlynne, N. J.

Original No. 2,132,183, dated October 4, 1938, Serial No. 84,956, June 12, 1936. Application for reissue April 13, 1939, Serial No. 267,729

9 Claims. (Cl. 33—204)

The present invention relates to devices for indicating angles, such for example as earth inductor compasses, which indicate the horizontal angle between a given reference line and the horizontal component of the earth's magnetic field. The present invention is useful in connection with such compasses, and is described as embodied in an instrument of this type, but it will be understood that the invention has many other uses, and is not in any way limited to compasses or other like instruments.

Broadly, the present invention relates to means for developing two alternating electromotive forces of identical frequency but differing in phase according to the direction of the magnetic field employed in generating one of said forces. Such electromotive forces are then employed, in a well known manner, for energizing a phase indicator, which shows the phase angle between the two generated voltages. When the earth's magnetic field is used in generating one of said voltages, said other voltage being generated by means not in any way responsive to said field, the phase indicator will in fact serve as a compass. The same apparatus, however, may be used to indicate the angle between any predetermined reference line and any desired magnetic field, as will be obvious from the description which follows:

It is a general object of the invention to provide means for generating two alternating voltages of identical frequency, which means shall be small, light in weight, compact, and inexpensive. Another object is the provision of such means, one of said voltages being generated without the use of any natural or artificial magnetic field, whereby the phase relation of the two voltages does not depend upon the direction of the earth's field or any other magnetic field.

More specifically, it is an object of the present invention to provide a rotor having a coil adapted to be rotated in a magnetic field, and a condenser plate adapted to be rotated past a fixed condenser plate, and means for driving said rotor, thereby setting up two alternating voltages of identical frequency but differing in phase according to the direction of said magnetic field. A further object is the provision of a novel, compact, inexpensive and advantageous earth inductor compass.

Other and further objects, features, and advantages will be apparent from the description which follows taken in connection with the accompanying drawings in which:

Figure 5 is a side elevation of a vertically disposed inductor unit;

Figure 6 is a vertical sectional view through the inductor unit on the line 6—6 of Figure 5;

Figure 7 is a sectional view on the line 7—7 of Figure 5;

Figure 8 is a sectional view on the line 8—8 of Figure 5;

Figure 9 is a diagrammatic circuit view of the inductor units;

Figure 10 is a diagram showing the connections between the inductor unit and the indicator, including the amplifier circuit;

Figure 11 is a diagrammatic view showing the circuit connections of a modified form of indicator;

Figure 12 is a diagrammatic view showing the circuit connections of an electrostatic form of indicator.

Figure 3:
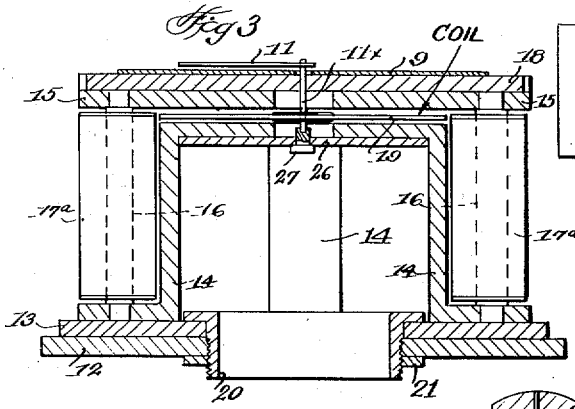
Figure 3 is a sectional view through the interior of the indicator with the casing removed.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

In carrying out my invention I provide a simple inductor for generating an alternating voltage resulting from the relative motion of a coil with respect to the horizontal component of the earth's magnetic field and also to set up another alternating voltage resulting from the varying capacitance between a fixed and a moving electrode.

Referring particularly to Figures 5 to 9, inclusive, of the drawings I have shown therein an inductor unit including a coil 1 of moderate turns of fine wire which is mounted in a groove in a cylinder 2 made of insulating material. The latter has stub shafts 2× for rotatably mounting the cylinder and the coil on a vertical axis. At the lower end of the cylinder there is a bucket wheel 3 which is rotated by air jets emerging from nozzles 4 as a result of pressure difference, or by other suitable means (not shown). A semicircular plate or electrode 5, which may be a thin piece of aluminum foil, is secured to the surface of the cylinder 2 to revolve therewith.

A fixed plate or electrode 6 of semi-cylindrical shape is disposed adjacent to and concentric with the electrode 5 as shown in the drawings. In actual use in a compass, the inductor unit just described will be mounted in gimbals or controlled gyroscopically or by any suitable means (not shown) so that the axis of the rotor will be maintained in a vertical position.

The construction just described forms a simple inductor for generating two alternating voltages of the same frequency. One voltage is set up by the rotation of a coil in a magnetic field, in this case the horizontal component of the earth's magnetic field. The other voltage is set up by the varying capacitance between the fixed and the moving plates 5 and 6.

Figure 2:
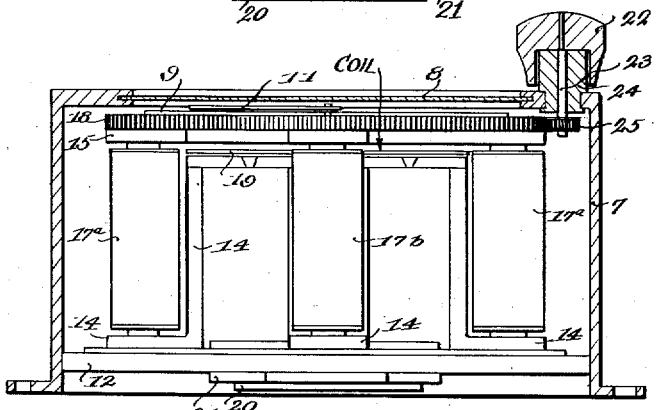
Figure 2 is a view partly in section of the casing of an indicator, the coils and gearing being shown in side elevation.
Figure 13:
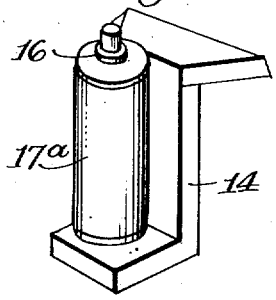
Figure 13 is a view in perspective of a magnet and pole piece in detached relation.
Figure 4:
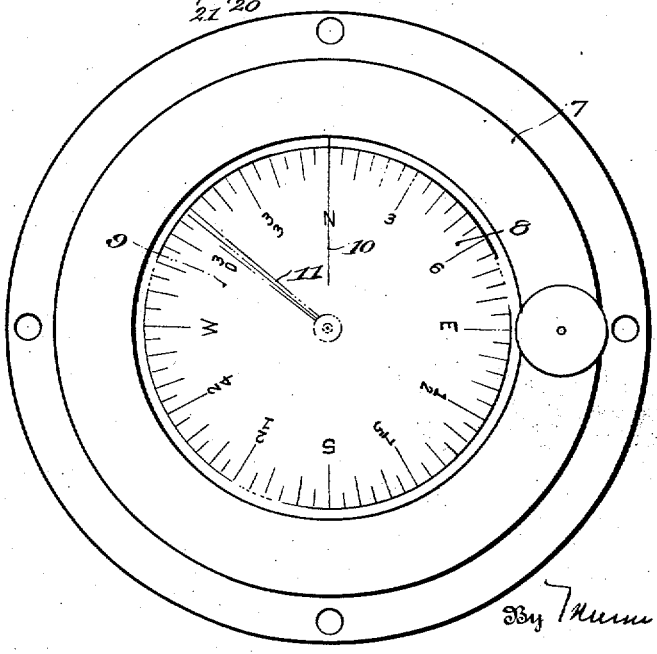
Figure 4 is a plan view of the indicator.

The indicator is illustrated in Figures 2 to 4. It consists of an exterior casing 7 which bears a circular glass plate 8 beneath which is a compass card 9.

At 10 (Fig. 4) I have indicated a lubber's line formed on the underside of the glass plate 8, and at 11, a steering and course indicator. Secured to the casing 7 is a base 12 upon which is mounted a bearing ring 13. Carried by the bearing ring are four pole pieces 14. An upper pole piece 15 is connected by the field cores 16 to the lower pole pieces 14 and coils 17$^a$ and 17$^b$ are provided as shown in the drawings. A gear 18 is mounted on the upper pole piece 15 and the compass card 9 is mounted on the gear, as shown, to turn therewith. A coil 19 is disposed between the pole pieces as shown, and this coil is secured to the pivot shaft 11$^\times$ of the needle 11 so that the latter is turned with the coil. The coil 19 is in the field of the magnetic flux set up by current flowing through coils 17$^a$ and 17$^b$ as will be hereinafter explained. A collar 20 is threaded into the base 12 and forms a guide for the bearing ring 13. This collar is held in position by means of a nut 21. A knob 22 is provided with a shaft 23 centrally disposed in a guide 24 carried by the casing 7. The shaft bears a pinion 25 meshing with the gear 18. A plate 26 having a thrust bearing 27 supports the pivot shaft 11$^\times$.

In Figure 10 I have shown the circuits by means of which the device is operated. In this figure A indicates in general the amplifier input circuit. This includes the inductor coil 1 associated with a grid 28, and the electrode plates 5 and 6 associated with a grid 29. B indicates in general the output circuit including the plates 30 and 31 of the output tubes. Phase splitting and phase control circuits for the electromagnetic type of indicator are shown in general at C and the indicator circuits at D.

Two alternating voltages are set up in the following manner in Figure 10. The rotating coil 1 is connected between the grid 28 and the ground. The rotating plate 5 is connected to the ground and the fixed plate 6 is connected through a blocking condenser to grid 29. Grids 28 and 29 are biased sufficiently negative so that at no time is there grid current flowing. A fairly high D. C. voltage is maintained between +B and the ground. This potential acting through the high resistance 39 holds a substantially constant charge on plate 6. When the rotor of the inductor unit spins an alternating voltage is set up across grid 28 and the ground due to the action of the earth's magnetic field upon coil 1. At the same time plate 5 is also revolved, and so the capacitance between plates 5 and 6 is fluctuating. Since the charge on plate 6 remains constant and the voltage across 5 and 6 must fluctuate this gives rise to an alternating voltage between grid 29 and the ground. Obviously these two voltages must be of the same frequency since coil 1 and plate 5 are mechanically tied together and rotated as a unit with no relative motion between them. Since plate 6 never changes its position with respect to the ship that is carrying the compass and since the ship does change its position with respect to the earth's magnetic field, it is evident that the phase angle between the two alternating voltages can have any value between 0 and 360 degrees.

In the system described thus far there is practically a zero current flow, that is, it is a potential operated system. This means that if resistance variations are introduced into the circuits as the stub shafts 2$^\times$ rotate in their bearings no objectionable effects will be set up in the system.

This arrangement then provides a means for generating two alternating voltages of the same frequency and whose phase angle is controlled by the direction in which the system is pointing with respect to the direction of the earth's magnetic field or such other field as may be used.

In carrying out the invention use is made of the forces set up by a rotating field acting upon a simple alternating one.

In Figure 10 two sets of coils 17$^a$ and 17$^b$ are shown. These are the field coils of the indicator and are located physically 90 degrees apart. The circuit consisting of the condenser 44, the resistor 41 and the coil 17$^a$ obtains its energy from the same amplifier as does the circuit consisting of the coil 43 and resistor 42 and the coil 17$^b$. The electrical values of the elements of these two circuits are so chosen that the phase angle between the current flowing in coil 17$^a$ and that flowing in coil 17$^b$ is 90 degrees. The magnetic flux set up by these two currents in the field structure of the indicator then has the well known rotating characteristic. Coil 19 is situated in this field and is mounted on a shaft so that it is free to rotate, and this coil is supplied with current from the other amplifier. This current sets up about coil 19 a simple alternating magnetic field. Since the frequency of the rotating and the alternating fields is the same, the forces set up by the action of the two fields are such that coil 19 assumes a position of rest and this position is determined by the phase angle of the two amplifier output voltages.

The circuit elements 45, 46, 47 and 48 provide compensation to prevent indicator errors which would ordinarily appear whenever the speed of the inductor rotor deviated from some pre-assigned value.

Figure 1:
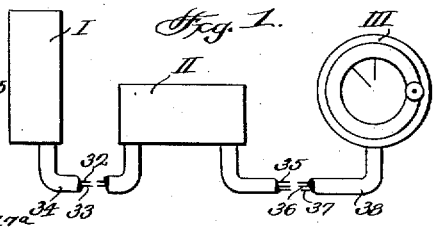
Figure 1 is a diagrammatic showing of the general arrangement of the three essential parts.

The device, as pointed out above, consists essentially of three units, the inductor unit shown generally at I in Figure 1, the amplifier unit at II, and the indicator unit at III. Between the inductor unit I and the amplifier unit II are two wires 32 and 33 enclosed in a shell 34 which can be metal tubing or metal braid and forms the ground return of the circuits. Between the amplifier unit and the indicator unit there are three wires indicated at 35, 36 and 37, respectively, enclosed in a shell 38. It will be noted that there are absolutely no mechanical connections between these three units.

From the foregoing description of the various parts of the device the operation thereof may be readily understood. The circuit illustrated in Figure 10 is for the electromagnetic type, as stated.

Assuming that the rotor has been set in operation, the coil 1 rotating in the earth's field impresses a sine wave of voltage across the grid 28, the battery +B acting through 39 charges the fixed electrode 6. As electrode 5 rotates the capacitance of 6 to ground varies and so the voltage across 6 and ground varies. Hence the voltage impressed across grid 29 varies in the same way. The electrode plates 5 and 6 are so shaped that the voltage wave impressed on the grid 29 is sinusoidal. Thus there are two sine voltages generated. Since the coil and the movable electrode 5 are mechanically connected together and turn about the same axis there can be no frequency difference between the two voltages but since the stationary electrode never changes its position with respect to the moving body to which it is attached, and since the course of the moving body does change with respect to the direction of the earth's field, the phase between the two generated voltages will change and in direct proportion to the course changes.

These two induced voltages are amplified and are impressed on the indicator in the manner shown in the drawings. It will be observed that the coil 19 carries alternating current whose frequency is the same as that of the indicator field. During one revolution of the indicator field the coil 19 is subjected to a sinusoidally varying torque that reverses its direction four times. Because of its inertia the coil cannot follow these torque reversals but takes up a stable position of rest. This position is at the point where the current in the coil is a maximum. The point where maximum current occurs is determined by the phase angle of the two induced voltages in the inductor unit. Therefore the coil takes up a position which is controlled by the heading of the moving body with respect to the horizontal component of the earth's magnetic field. By providing the movable coil with a needle or pointer, such as that shown at 11, that travels over a 360° scale, shown at 9, the device becomes a compass.

It will be noted that in the device described above the output tube of one amplifier feeds into a phase splitting circuit. This circuit supplies two currents that differ in phase by 90°. To secure a 90° phase displacement between the two field currents the resistances of 41 and 42 must be equal, and also the square root of the ratio of the reactance of 43 to that of 44 must be equal to the resistance of 41. Therefore to have proper phase control of the current flowing through the moving coil 19, 45 must equal 41, 46 must equal 42, 47 must equal 43 and 48 must equal 44. The indicator derives its rotating field from these two currents. The other output tube feeds into a phase control circuit from which is obtained a current for moving the coil 19 of the indicator. The reason for using this phase control circuit is to prevent indicator errors which would ordinarily appear whenever the speed of the inductor rotor departed from a pre-assigned value.

In Figure 11 I have shown a circuit in which a low impedance metal ring or properly shaped iron vane 40 is employed moving in a field which is the resultant of two equal but oppositely rotating fields, and carries the compass needle. In this form there is no external moving coil circuit.

The double field magnetic type indicator with a single turn coil (metal ring) is the simplest, most rugged, and cheapest to build. This form of indicator is also advantageous in that the bearings of the moving parts may be designed solely for supporting the moving system with a minimum of friction, there being no necessity of providing electrical connection through the bearings, and the iron magnetic circuit of the indicator can be arranged in a very compact manner.

The substitution of the electrostatic for electromagnetic effects will produce the same result. In Figure 12 I have shown the circuits for the electrostatic indicator. Condenser 49 and resistance 50 are placed in the phase splitting circuit while resistance 51 and condenser 52 are in the phase control circuit. 53 and 54 are the field plates and 55, shown partly in dotted lines, is the moving vane. For proper action the reactance 49 should be approximately equal to the resistance 50 and 51 and 52 should have corresponding values.

Advantages of the electrostatic type of indicator are that it can be used to measure the phase angle between fairly high frequencies, at which high frequencies the magnetic type indicators of Figures 10 and 11 may be unsuitable for obvious reasons. Also, there need be only one electrical connection through the bearing for the moving system, and the current carried by this connection is exceedingly small.

In the electrostatic type the parts are of smaller physical size and weight and smaller power output is required from the amplifiers to operate the indicator. However, it is not so apt to withstand shocks and vibration to which it will be subject in service and more skill is required in building it. In addition the insulation of all the circuits must be maintained at a high value.

In using either type of this device the navigator rotates the gear 18 by means of the knob 22, thus rotating the field coils 17a and 17b and the chart, so that any point on the scale can be made to coincide with the lubber's line. This enables the navigator to set the compass so that the compass course to be followed lies on the lubber's line. The pilot then simply steers the course so that the needle of the compass aligns with the lubber's line, thus making of this instrument both a compass and a course indicator.

The device has numerous advantages. The mechanical drive between the inductor unit and the instrument board is eliminated. There are no brushes, commutators, or slip rings. There are but two moving parts, the inductor rotor and the indicator moving coil. There are no delicate parts requiring precision adjustments for proper operation of the compass.

The actual compass course of a moving body is shown, and not merely whether the body is moving along a previously determined course.

Compass readings are not affected by variation in the strength of the earth's field nor are they affected by contact resistances, speed of the induction rotor, or by amplifier gain whether due to changes in supply voltages or aging of the tubes.

Having thus described the invention, what is claimed as new and desired to be secured by Letters Patent is:

1. In an inductor compass, an indicator unit having a plurality of field coils provided with pole pieces, a rotatable coil centrally disposed between said pole pieces electromagnetically reacting with and controlled by the field set up by the coils, a needle carried by said coil, a direction chart, a stationary lubber's line, means for rotating said field coils, pole pieces, and chart simultaneously to bring said chart into registration with said lubber's line, and means for producing a rotating field in said field coils, said means comprising an inductor unit for generating an alternating voltage from the horizontal component of the earth's magnetic field, and a second means for generating an alternating voltage of the same frequency, an amplifying means for each voltage, one of said amplifiers being associated with certain of said field coils for energizing them and the other of said amplifiers being associated with other field coils, said rotatable coil and needle adapted to assume a position of rest, the position being determined by the phase angle of the output voltages of the amplifying means.

2. In an inductor compass, an indicator unit having a plurality of field coils, a rotatable coil electromagnetically reacting with and controlled by the field set up by the coils, a needle carried by said rotatable coil, a chart disposed beneath the needle, means for simultaneously rotating the chart and field coils, a stationary lubber's line, means for producing a rotating field in said field coils, said means comprising an inductor unit for generating an alternating voltage from the horizontal component of the earth's magnetic field and a second means for generating an alternating voltage of the same frequency, an amplifying means for each voltage, a split phase circuit associated with one of said amplifying means and having connections with certain of the field coils and a phase control circuit associated with the other amplifying means and being connected with the rotatable coil, said rotatable coil and needle adapted to assume a position at rest, the position being determined by the phase angle of the output voltages of the amplifying means.

3. In a device for indicating the angular relation of a magnetic field with respect to a given reference line, a rotatable coil disposed in said magnetic field, a condenser plate rotatable with said coil, means for synchronously rotating said coil and condenser plate, a second condenser plate mounted adjacent to the orbit of said first condenser plate and fixed in relation to said reference line, means for keeping said condenser charged, a phase indicating device, and means connecting said indicating device to said rotatable coil and said condenser, said rotatable coil and said condenser being adapted to generate alternating potentials whose phase relation is dependent upon the direction of said magnetic field with respect to said reference line, whereby said indicating device is caused to register the angular relation of said magnetic field to said reference line.

4. In a device for indicating the angular relation of a magnetic field with respect to a given reference line, a rotor disposed in said magnetic field and carrying a coil and a condenser plate, means for driving said rotor, a fixed condenser plate mounted adjacent the orbit of said first condenser plate, said condenser plate constituting a variable condenser, means for keeping said condenser charged, a phase indicating device, and means connecting said indicating device to said rotatable coil and said condenser, said rotatable coil and said condenser being adapted to generate alternating potentials whose phase relation is dependent upon the direction of said magnetic field with respect to said reference line, whereby said indicating device is caused to register the angular relation of said magnetic field to said reference line.

5. In a device for indicating the angular relation of a magnetic field with respect to a given reference line, a rotor disposed in said magnetic field and carrying a coil and a condenser plate, means for driving said rotor, a fixed condenser plate mounted adjacent the orbit of said first condenser plate, said condenser plate constituting a variable condenser, means for keeping said condenser charged, said condenser plate being so shaped, relatively, that the capacitance of said condenser varies substantially sinusoidally as said rotor revolves, a phase indicating device, and means connecting said indicating device to said rotatable coil and said condenser, said rotatable coil and said condenser being adapted to generate alternating potentials whose phase relation is dependent upon the direction of said magnetic field with respect to said reference line, whereby said indicating device is caused to register the angular relation of said magnetic field to said reference line.

6. A device according to claim 3, said phase indicating device comprising a scale, a needle, a rotatable short-circuited conducting member secured to said needle, and a field structure disposed adjacent to said short-circuited member and comprising a group of coils adapted to be energized by one of said alternating potentials and a second group of coils adapted to be energized by said other alternating potential, said field coils being so arranged and connected as to produce two oppositely rotating fields when energized.

7. A device according to claim 3, said phase indicating device comprising a scale, a needle, a rotatable vane secured to said needle, and a plurality of electrostatic field plates disposed adjacent to said vane and adapted to be energized by one of said alternating potentials to produce a rotating electrostatic field, said rotatable vane being adapted to be energized by said other alternating potential.

8. In a device for indicating the angular relation of a magnetic field with respect to a given reference line, means for generating two alternating potentials of like frequency but differing in phase by an angle equal to the space angle between said field and said reference line, a phase indicating device, and means connecting said generating means and said phase indicating device, said phase indicating device comprising a scale, a needle, a rotatable short-circuited conducting member secured to said needle, and a field structure disposed adjacent to said short-circuited member and comprising a group of coils adapted to be energized by one of said alternating potentials and a second group of coils adapted to be energized by said other alternating potential, said field coils being so arranged and connected as to produce two oppositely rotating fields when energized.

9. In a device for indicating the angular relation of a magnetic field with respect to a given reference line, means for generating two alternating potentials of like frequency but differing in phase by an angle equal to the space angle between said field and said reference line, a phase indicating device, and means connecting said generating means and said phase indicating device, said phase indicating device comprising a scale, a needle, a rotatable vane secured to said needle, and a plurality of electrostatic field plates disposed adjacent to said vane and adapted to be energized by one of said alternating potentials to produce a rotating electrostatic field, said rotatable vane being adapted to be energized by said other alternating potential.

HENRY D. OAKLEY.